F. W. MORGAN.
BALL CASTER.
APPLICATION FILED APR. 10, 1913.

1,082,968.

Patented Dec. 30, 1913.

Attest:
Wm Janus.
LeRoy M. Carr.

Inventor:
Frederick W. Morgan

UNITED STATES PATENT OFFICE.

FREDRICK W. MORGAN, OF ST. LOUIS, MISSOURI.

BALL-CASTER.

1,082,968.　　　Specification of Letters Patent.　　Patented Dec. 30, 1913.

Application filed April 10, 1913. Serial No. 760,182.

*To all whom it may concern:*

Be it known that I, FREDRICK W. MORGAN, a citizen of the United States, residing at St. Louis, State of Missouri, have invented new and useful Improvements in Ball-Casters, of which the following is a specification.

My invention relates to new and useful improvements in casters, such as are ordinarily used on heavy pieces of furniture, and the like, the principal object of my invention being to construct a simple inexpensive caster having a rolling support in the form of a ball, and which ball or rolling support bears against a plurality of sets of small balls, which latter are located in races formed in resilient supports within the housing of the caster.

By my improved construction the friction between the rolling support and its bearings is reduced to a minimum, and the large ball or rolling support is yieldingly mounted within the caster housing.

Figure 1:
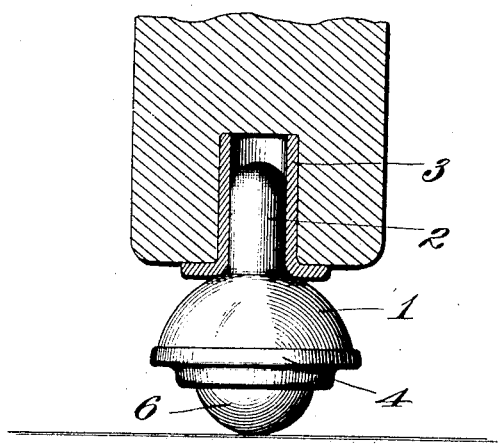
Figure 2:
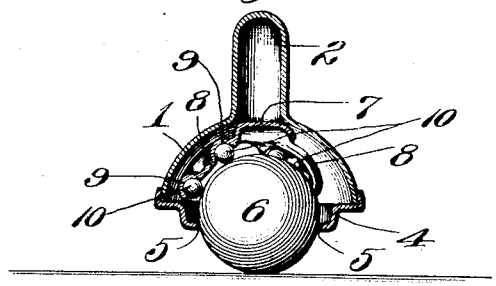
Figure 3:
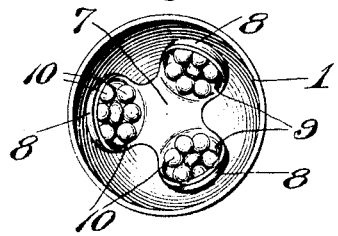

To the above purposes my invention consists in certain novel features of construction and arrangement of parts hereinafter more fully described, claimed and shown in the accompanying drawings, in which:

Figure 1 is a side elevational view of one of my improved casters in position for use. Fig. 2 is a vertical section taken through the center of my improved caster. Fig. 3 is a view looking into the underside of the upper portion of the caster housing and showing the resilient support for the series of small balls against which the large ball or rolling support engages.

Referring by numerals to the accompanying drawings 1 designates the upper portion of the caster housing which is in the form of a hollow shell hemispherical in shape and provided with an integral tubular stem 2, which is adapted to fit in a socket 3 in the article of furniture to which the caster is applied. Fixed to the lower edge of the shell or housing 1 is a depending inwardly projecting ring 4 in which is formed an opening 5.

6 designates the rolling support of my improved caster, the same being in the form of a ball, and when the parts of the caster are properly assembled, a portion of this ball projects through the opening 5 as seen in Figs. 1 and 2.

Positioned within the housing 1 immediately below the stem 2 is a plate 7 provided with three downwardly projecting arms 8, which latter are provided in their undersides with annular grooves 9. These grooves form races for a series of small balls 10, and when the parts are properly assembled the ball or rolling support 6 bears against the balls 10. The plate 7 and arms 8 are formed of resilient material, and thus the balls 10 positioned in the races 9 in said arms 8 form a yielding roller bearing for the ball or rolling support 6.

A caster of my improved construction is comparatively simple, can be easily and cheaply manufactured and the ball bearings for the rolling support or ball 6 are yieldingly mounted within the housing so that said rolling support or ball is capable of yielding movement with respect to the part supported thereby.

I claim:

1. In a caster, a housing, a large ball loosely mounted therein, a member within the housing above the large ball, which member is provided with a series of radially arranged arms, and a series of small balls arranged between each arm and the large ball.

2. In a caster, a housing, a large ball loosely mounted therein, a series of independently movable resilient arms positioned within the housing above the large ball, and a series of small balls arranged between each resilient arm and the large ball.

3. The hereindescribed caster comprising a housing, a large ball loosely mounted therein, a member mounted in the housing, and having a plurality of independently yielding arms, in each of which is formed a ball race, and a series of small balls arranged in each race, which small balls bear upon the large ball.

4. In a caster of the class described, a housing, a large ball loosely mounted therein, a resilient member located in the housing above the large ball, which resilient member is provided with a plurality of separate ball races, and a series of small balls arranged in each of said races and bearing against the large ball.

In testimony whereof I hereunto affix my signature in the presence of two witnesses, this 30th day of March, 1913.

FREDRICK W. MORGAN.

Witnesses:
E. H. STALEY,
M. M. GEORGE.